(12) United States Patent
Shirahige

(10) Patent No.: US 12,527,103 B2
(45) Date of Patent: Jan. 13, 2026

(54) PHOTOELECTRIC CONVERSION APPARATUS AND EQUIPMENT

(71) Applicant: CANON KABUSHIKI KAISHA, Tokyo (JP)

(72) Inventor: Daiki Shirahige, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 200 days.

(21) Appl. No.: 18/426,613

(22) Filed: Jan. 30, 2024

(65) Prior Publication Data

US 2024/0266372 A1 Aug. 8, 2024

(30) Foreign Application Priority Data

Feb. 6, 2023 (JP) ................................ 2023-016354

(51) Int. Cl.
*H10F 39/00* (2025.01)
*H04N 25/778* (2023.01)

(52) U.S. Cl.
CPC ..... *H10F 39/80373* (2025.01); *H04N 25/778* (2023.01); *H10F 39/80377* (2025.01); *H10F 39/811* (2025.01)

(58) Field of Classification Search
CPC ......... H10F 39/80373; H10F 39/80377; H10F 39/811; H10F 39/8037; H10F 39/802; H10F 39/812; H04N 25/778
See application file for complete search history.

(56) References Cited

U.S. PATENT DOCUMENTS

| 9,123,653 B2 * | 9/2015 | Yamaguchi ......... H10F 39/1825 |
| 2022/0021826 A1 * | 1/2022 | Ejiri ...................... H10F 39/014 |
| 2022/0271070 A1 | 8/2022 | Nakazawa et al. |
| 2023/0053980 A1 | 2/2023 | Shirahige |
| 2023/0253438 A1 * | 8/2023 | Shim .................. H10F 39/8033 |
| | | 257/292 |
| 2024/0088186 A1 | 3/2024 | Shirahige |

FOREIGN PATENT DOCUMENTS

WO 2020/262643 A1 12/2020

* cited by examiner

*Primary Examiner* — Twyler L Haskins
*Assistant Examiner* — John H Morehead, III
(74) *Attorney, Agent, or Firm* — Venable LLP

(57) ABSTRACT

A photoelectric conversion apparatus in which a first semiconductor layer comprising a photoelectric conversion element and a second semiconductor layer comprising a pixel circuit are stacked, is provided. A plurality of through electrodes are arranged in the second semiconductor layer. The pixel circuit includes a pixel transistor comprising a first region and a second region as a source or a drain, and a gate electrode arranged on a main surface of the second semiconductor layer to form a channel between a first end portion of the first region and a second end portion of the second region. The gate electrode includes a first side in the proximity of the first end portion and a second side in the proximity of the second end portion, and the first side and the second side extend in directions intersecting each other, respectively.

20 Claims, 12 Drawing Sheets

PHOTOELECTRIC CONVERSION APPARATUS AND EQUIPMENT

BACKGROUND

Field of the Disclosure

The present disclosure relates to a photoelectric conversion apparatus and equipment.

Description of the Related Art

In order to increase the density of pixel arrangement, International Publication No. 2020/262643 describes a solid-state imaging apparatus in which the first semiconductor layer including a photoelectric conversion unit and the second semiconductor layer provided with a pixel transistor that reads out a signal generated by the photoelectric conversion unit are stacked.

SUMMARY

In order to improve the characteristic of the photoelectric conversion apparatus by further increasing the density of pixel arrangement or the like, it is necessary to improve the degree of freedom in arrangement of the pixel transistor.

Some embodiments of the present disclosure provide a technique advantageous in improving the characteristic of a photoelectric conversion apparatus.

According to some embodiments, a photoelectric conversion apparatus in which a first semiconductor layer comprising a photoelectric conversion element and a second semiconductor layer comprising a pixel circuit configured to output a signal based on charges generated by the photoelectric conversion element are stacked, wherein a plurality of through electrodes are arranged in the second semiconductor layer, each of which extends through the second semiconductor layer and electrically connects an element arranged in the first semiconductor layer with an element arranged in the second semiconductor layer, the pixel circuit includes a pixel transistor comprising a first region and a second region configured to function as a source or a drain, and a gate electrode arranged on a main surface of the second semiconductor layer to form a channel between a first end portion of the first region and a second end portion of the second region, in an orthogonal projection with respect to the main surface, the gate electrode includes a first side in the proximity of the first end portion and a second side in the proximity of the second end portion, and the first side and the second side extend in directions intersecting each other, respectively, is provided.

Further features of the present disclosure will become apparent from the following description of exemplary embodiments (with reference to the attached drawings).

DESCRIPTION OF THE EMBODIMENTS

Figure 1:
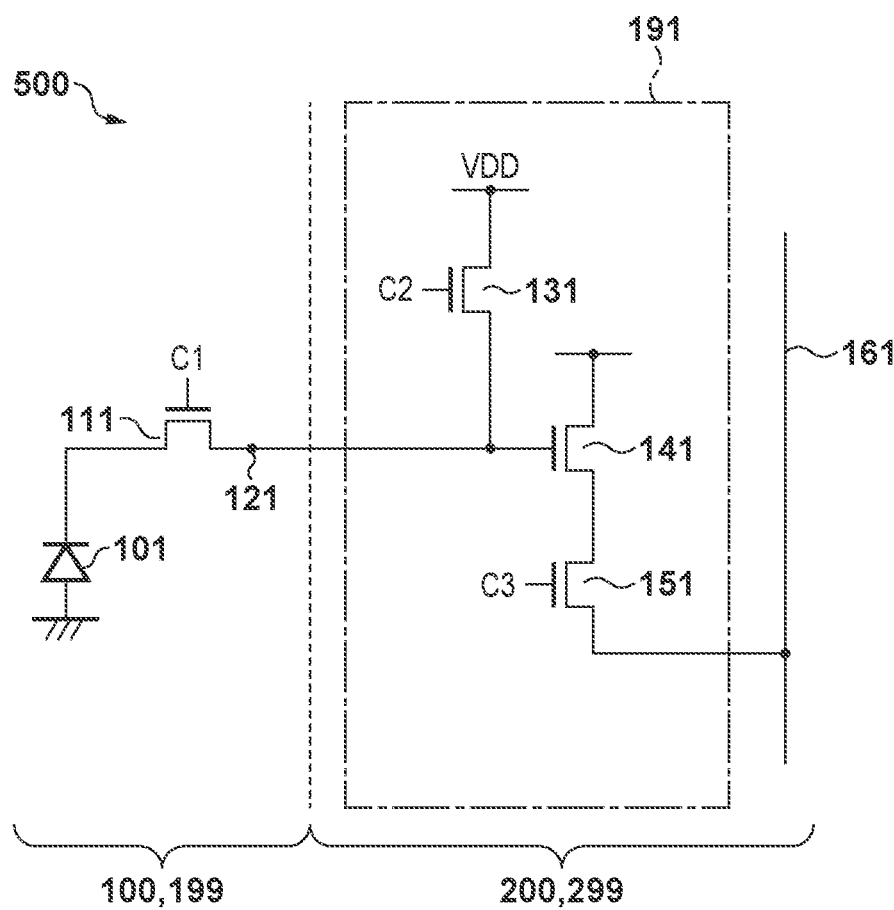
FIG. 1 is a circuit diagram showing an example of the arrangement of a photoelectric conversion apparatus according to an embodiment.

Hereinafter, embodiments will be described in detail with reference to the attached drawings. Note, the following embodiments are not intended to limit the scope of the claimed disclosure. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the following description, terms (for example, "upper", "lower", "right", "left" and other terms including these terms) representing specific directions or positions are used, as necessary. These terms are used for easy understanding of the present invention with reference to the accompanying drawings, and the meanings of the terms do not limit the technical scope of the present disclosure. That is, a vertically reversed arrangement also falls within the technical scope of the present disclosure.

FIG. 1 shows an equivalent circuit diagram including a photoelectric conversion unit and a pixel circuit of a photoelectric conversion apparatus 500 according to an embodiment of the present disclosure. FIG. 1 is an equivalent circuit diagram of one pixel arranged in the photoelectric conversion apparatus 500. FIG. 1 shows one pixel, but the photoelectric conversion apparatus 500 includes a pixel region where a plurality of pixels are arranged in, for example, a matrix. As shown in FIG. 1, in the photoelectric conversion apparatus 500, a semiconductor layer 100 including a photoelectric conversion element 101 and a semiconductor layer 200 including a pixel circuit 191 that outputs a signal based on charges generated by the photoelectric conversion element 101 are stacked.

In addition to the photoelectric conversion element 101, a transfer transistor 111 can be arranged in the semiconductor layer 100. The photoelectric conversion element 101 generates charges corresponding to incident light. The photoelectric conversion element 101 can be, for example, a photodiode. The transfer transistor 111 is arranged between the photoelectric conversion element 101 and a floating diffusion (FD) 121 arranged in the semiconductor layer 100, and transfers the charges generated by the photoelectric conversion element 101 to the FD 121.

The cathode of the photoelectric conversion element 101 is electrically connected to the source of the transfer transistor 111, and the anode of the photoelectric conversion element 101 is electrically connected to a reference potential line (for example, a ground potential). The drain of the transfer transistor 111 is electrically connected to the FD 121. The gate of the transfer transistor 111 is electrically connected to a pixel driving line C1. In accordance with the signal supplied to the pixel driving line C1, the charges output from the photoelectric conversion element 101 are temporarily held by the FD 121 via the transfer transistor 111.

The pixel circuit 191 arranged in the semiconductor layer 200 includes, for example, a reset transistor 131, a selection transistor 151, and an amplification transistor 141. The gate of the reset transistor 131 is electrically connected to a pixel driving line C2. The source of the amplification transistor 141 is electrically connected to the drain of the selection transistor 151, and the gate of the amplification transistor 141 is electrically connected to the source of the reset transistor 131. The source of the selection transistor 151 is electrically connected to an output line 161, and functions as the output terminal of the pixel circuit 191. The gate of the selection transistor 151 is electrically connected to a pixel driving line C3.

When the transfer transistor 111 is set in the ON state in accordance with the signal supplied to the pixel driving line C1, it transfers the charges generated by the photoelectric conversion element 101 to the FD 121. As will be described later with reference to FIG. 3, the gate of the transfer transistor 111 may be provided on a main surface 102 of the semiconductor layer 100. Alternatively, as will be described later with reference to FIG. 4, the gate of the transfer transistor 111 may extend from the main surface 102 of the semiconductor layer 100 to the depth reaching the photoelectric conversion element 101. That is, the gate of the transfer transistor 111 may be in a form of a vertical transfer gate.

The source of the reset transistor 131, which functions as the input terminal of the pixel circuit 191, is electrically connected to the FD 121 and the gate of the amplification transistor 141, and the drain of the reset transistor 131 is electrically connected to a power supply line VDD. The reset transistor 131 resets the potential of the FD 121 to a predetermined potential. When the reset transistor 131 is set in the ON state in accordance with the signal supplied to the pixel driving line C2, the potential of the FD 121 is reset to the potential of the power supply line VDD.

The selection transistor 151 controls the timing of outputting a signal from the pixel circuit 191 in accordance with the signal supplied to the pixel driving line C3. That is, the selection transistor 151 is arranged to output a signal corresponding to the potential of the FD 121 from the pixel circuit 191. In accordance the pixel arrangement, the selection transistor 151 may be omitted.

The amplification transistor 141 generates, as a signal to be output from the pixel, a signal having a voltage corresponding to the level of charges held by the FD 121. The amplification transistor 141 forms a source-follower type amplifier, and outputs a signal having a voltage corresponding to the level of charges generated by the photoelectric conversion element 101. When the selection transistor 151 is set in the ON state in accordance with the signal supplied to the pixel driving line C3, the amplification transistor 141 amplifies the potential of the FD 121, and outputs a voltage corresponding to the potential of the FD 121 to a column circuit (not shown) via the output line 161.

The selection transistor 151 may be provided between the power supply line VDD and the amplification transistor 141. In this case, the drain of the reset transistor 131 is electrically connected to the power supply line VDD and the drain of the selection transistor 151. The source of the selection transistor 151 is electrically connected to the drain of the amplification transistor 141, and the gate of the selection transistor 151 is electrically connected to the pixel driving line C3. Further, the source of the amplification transistor 141 is electrically connected to the output line 161, and the gate of the amplification transistor 141 is electrically connected to the source of the reset transistor 131.

As will be described later with reference to FIG. 3, the dotted line shown in FIG. 1 represents a connection surface between a structure 199 including the semiconductor layer 100 and a structure 299 including the semiconductor layer 200. In the photoelectric conversion apparatus 500, the photoelectric conversion element 101 and the transfer transistor 111 are arranged in the structure 199, and the pixel circuit 191 including the reset transistor 131, the amplification transistor 141, and the selection transistor 151 is arranged in the structure 299.

Figure 2:
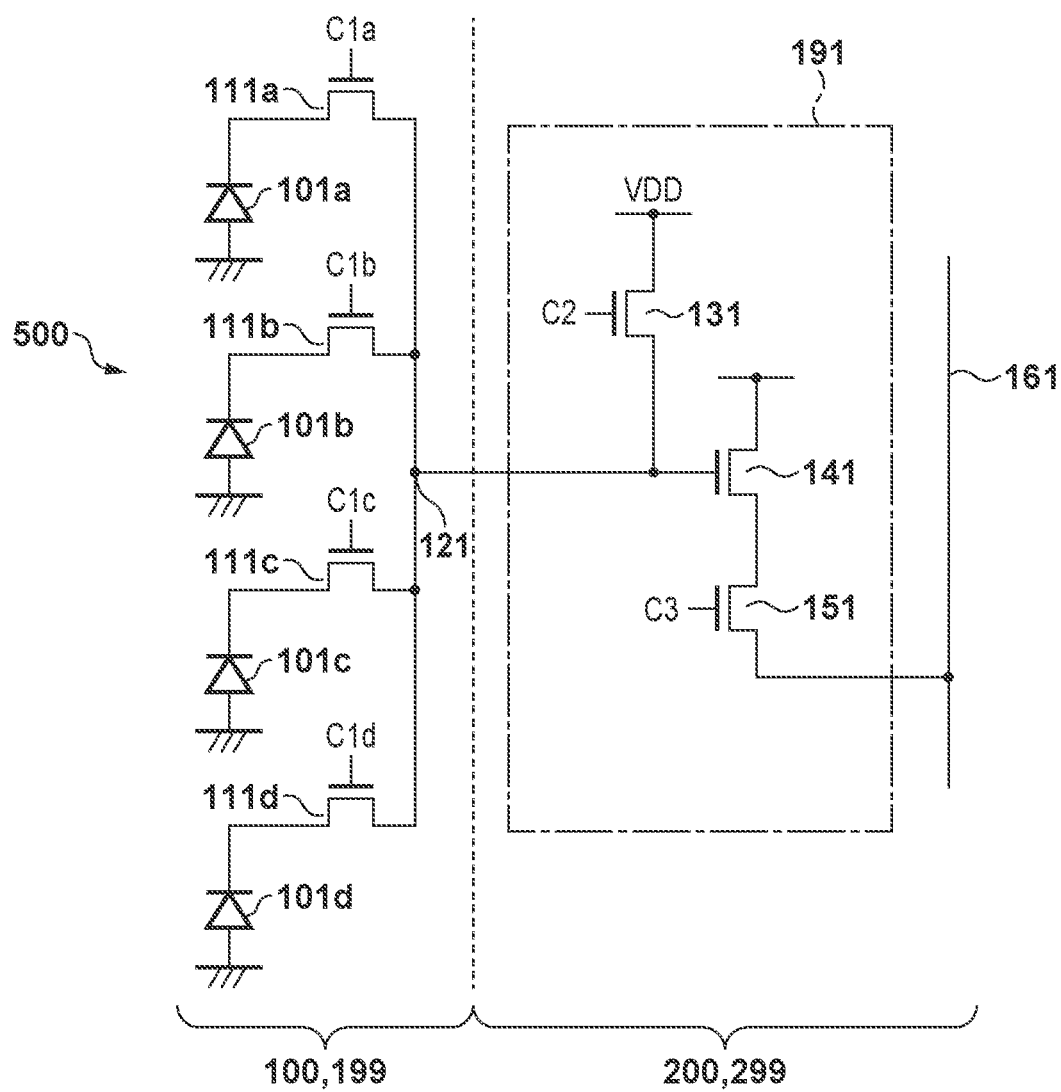
FIG. 2 is a view showing a modification of the photoelectric conversion apparatus shown in FIG. 1.

FIG. 2 is a view showing a modification of the pixel shown in FIG. 1. FIG. 2 shows an equivalent circuit including four pixels arranged in the photoelectric conversion apparatus 500. An example is shown in which the FDs 121 of multiple photoelectric conversion elements 101 are electrically connected to each other, and electrically connected to the input terminal of the common pixel circuit 191. That is, the pixel circuit 191 is shared by the multiple photoelectric conversion elements 101. In FIG. 2, in order to identify the photoelectric conversion element 101, the transfer transistor, and the like corresponding to each pixel, subscriptions "a" to "d" are added after the respective reference numerals. As shown in FIG. 2, by providing one pixel circuit 191 with respect to multiple photoelectric conversion elements 101a to 101d, the area occupied by the pixel circuit 191 in the photoelectric conversion apparatus 500 can be decreased.

As in FIG. 1, the dotted line shown in FIG. 2 represents a connection surface between the structure 199 including the semiconductor layer 100 and the structure 299 including the semiconductor layer 200. In the photoelectric conversion apparatus 500, the photoelectric conversion element 101 and the transfer transistor 111 are arranged in the structure 199, and the pixel circuit 191 including the reset transistor 131, the amplification transistor 141, and the selection transistor 151 is arranged in the structure 299.

Figure 3:
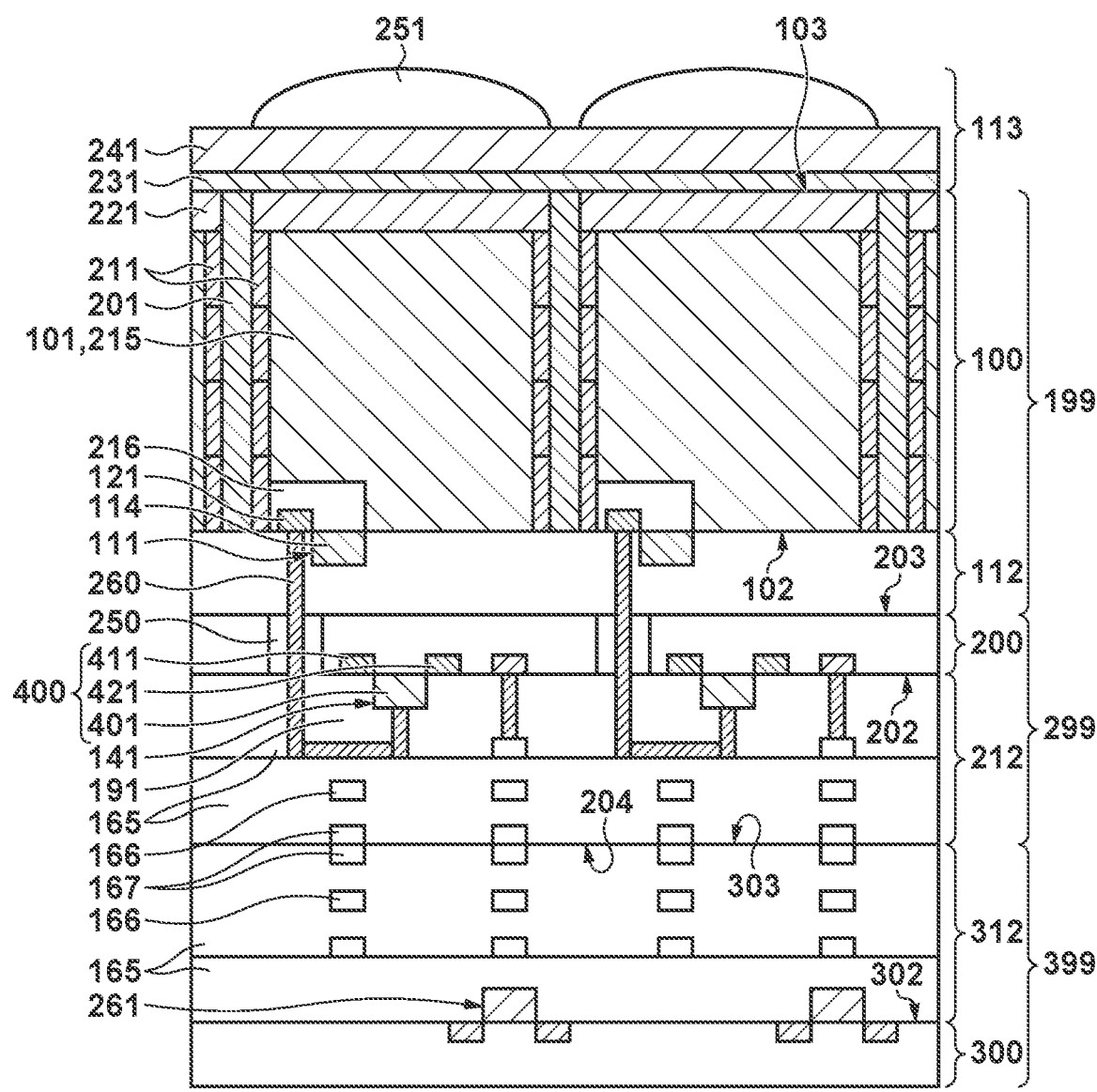
FIG. 3 is a sectional view showing an example of the arrangement of the photoelectric conversion apparatus shown in FIG. 1.

FIG. 3 is a sectional view of the pixel arranged in the photoelectric conversion apparatus 500 according to the embodiment, and corresponds to the equivalent circuit diagram shown in FIG. 1. In addition to the semiconductor layers 100 and 200 described above, a semiconductor layer 300 including at least one of a circuit for controlling the transfer transistor 111 and the pixel circuit 191, and a circuit for processing signals output from the transfer transistor 111 and the pixel circuit 191 is further stacked in the photoelectric conversion apparatus 500. As shown in FIG. 3, the semiconductor layer 200 is arranged between the semiconductor layer 100 and the semiconductor layer 300.

The structure 199 includes the semiconductor layer 100, a wiring structure 112, and a member 113. The structure 299 includes the semiconductor layer 200 and a wiring structure 212. As has been described above, the pixel circuit 191 is arranged in the structure 299, but the pixel circuit 191 is arranged on the side of a main surface 202 of the semiconductor layer 200. The main surface 202 is a surface of the semiconductor layer 200 on the opposite side of a surface 203 facing the semiconductor layer 100. That is, it can be said that the structure 299 is adhered to the structure 199 in a so-called face-to-back manner.

The wiring structure 212 arranged on the main surface 202 of the semiconductor layer 200 can include an insulation layer 165 and a conductive pattern layer 166 provided in the insulation layer 165. The insulation layer 165 may have a stacked structure including a plurality of layers. Two or more conductive pattern layers 166 may be arranged in the insulation layer 165.

A structure 399 includes the semiconductor layer 300 and a wiring structure 312. Similar to the wiring structure 212, the wiring structure 312 can include the insulation layer 165 and the conductive pattern layer 166 provided in the insulation layer 165. Also in the wiring structure 312, the insulation layer 165 may have a stacked structure including a plurality of layers. Also in the wiring structure 312, two or more conductive pattern layers 166 may be arranged in the insulation layer 165.

Each of a surface 204 of the wiring structure 212 on the opposite side of the semiconductor layer 200 and a surface 303 of the wiring structure 312 on the opposite side of the semiconductor layer 300 is formed by the insulation layer 165 and a conductive pattern 167. The conductive pattern 167 provided in each of the surface 204 of the wiring structure 212 and the surface 303 of the wiring structure 312 can also be called a pad layer or a pad electrode. The structure 299 and the structure 399 are integrated by bonding the insulation layer 165 and the conductive pattern 167 arranged in the surface 204 of the wiring structure 212 to the insulation layer 165 and the conductive pattern 167 arranged in the surface 303 of the wiring structure 312, respectively. The electric conduction between the wiring structure 212 and the wiring structure 312 is ensured between an element arranged in the semiconductor layer 200 and an element arranged in the semiconductor layer 300. That is, the structure 299 and the structure 399 are bonded in a so-called face-to-face manner by hybrid bonding.

For example, a single-crystal silicon may be used for the semiconductor layers 100, 200, and 300. The insulation layer 165 may be formed of, for example, silicon oxide (SiO) or the like. The insulation layer 165 may be provided with a barrier layer made of silicon carbine (SiC), silicon nitride (SiN), or the like to suppress metal diffusion from the conductive pattern layer 166 to the insulation layer 165. A metal such as copper (Cu) or aluminum (Al) can be used for the conductive pattern layer 166 and the conductive pattern 167. Particularly, the conductive pattern 167 to be bonded by hybrid bonding may be formed of Cu.

The structure 199 includes the photoelectric conversion element 101 in the semiconductor layer 100. In FIG. 3, the photoelectric conversion element 101 is shown as an n-type semiconductor region 215 which is a part of a photodiode serving as the photoelectric conversion element 101. The semiconductor region 215 functions as the cathode of the photodiode serving as the photoelectric conversion element 101. A p-type semiconductor region 211 and a p-type semiconductor region 221 are arranged around the semiconductor region 215. The semiconductor region 211 is a region provided to isolate each pixel. The semiconductor region 211 is supplied with the reference potential (for example, the ground potential), and functions as the anode of the photodiode serving as the photoelectric conversion element 101. Although not shown in FIG. 3, a conductive pattern is electrically connected to the semiconductor region 211, and supplied with the reference potential.

In the semiconductor layer 100, a p-type semiconductor region 216, in which the channel of the transfer transistor 111 is formed, is arranged. A gate electrode 114 of the transfer transistor 111 is arranged on the main surface 102 of the semiconductor layer 100. The FD 121 is arranged in the p-type semiconductor region 216. The FD 121 can be an n-type semiconductor region.

Here, the conductivity type of each of the n-type semiconductor region 215 and FD 121 and the p-type semiconductor regions 211 and 216 may be reversed. Appropriate conductivity types can be used for them in accordance with the specifications required for the respective pixels of the photoelectric conversion apparatus 500.

In the semiconductor layer 100, a pixel isolation portion 201 is provided at a position adjacent to the semiconductor region 211. The pixel isolation portion 201 may have a Deep Trench Isolation (DTI) structure provided so as to extend through the semiconductor layer 100. The DTI structure is formed by filling, with an insulator, a metal, or the like, an opening portion extending through the semiconductor layer 100.

The member 113 is arranged on a surface 103 of the semiconductor layer 100 on the opposite side of the main surface 102 facing the semiconductor layer 200. The member 113 can include a pinning layer 231, a planarization layer 241, a microlens 251, and the like. The pinning layer 231 is provided so as to contact the surface 103 of the semiconductor layer 100. The pinning layer 231 is, for example, a negative fixed charge layer. More specifically, the pinning layer is a layer formed of hafnium oxide, zircon oxide, aluminum oxide, titanium oxide, tantalum oxide, or the like. The negative fixed charge layer excites holes in the surface 103 of the semiconductor layer 100, and recombines holes and electrons when dark electrons are generated in the photodiode. Thus, electrons contributing to a noise signal can be suppressed. The planarization film 241 planarizes the underlayer of the microlens 251. A resin or the like may be used for the planarization film 241. A color filter may be arranged between the pinning layer 231 and the planarization film 241 or between the planarization film 241 and the microlens 251.

As has been described above, the pixel circuit 191 is arranged in the semiconductor layer 200. In the following description, the reset transistor 131, the amplification transistor 141, and the selection transistor 151 included in the pixel circuit 191 may be referred to as pixel transistors 400. Each pixel transistor 400 includes regions 411 and 421 functioning as one of the source and the drain, and a gate electrode 401 arranged on the main surface 202 of the semiconductor layer 200 to form a channel between the end portion of the region 411 and the end portion of the region 421. In FIG. 3, the amplification transistor 141 is shown as the pixel transistor 400.

A plurality of through electrodes 260 extending through the semiconductor layer 200 are arranged in the semiconductor layer 200. The through electrode 260 electrically connects an element such as the photoelectric conversion element 101 or the transfer transistor 111 arranged in the semiconductor layer 100 with an element included in the pixel circuit 191 arranged in the semiconductor layer 200.

The through electrode (not shown in FIG. 3) connected to the pixel driving line C1 described above is connected to the gate electrode 114 of the transfer transistor 111. When a predetermined voltage is applied via the pixel driving line C1, the transfer transistor 111 is turned on. When the transfer transistor 111 is turned on, the charges accumulated in the semiconductor region 215 are transferred to the FD 121. The FD 121 and the gate electrode (gate electrode 401) of the amplification transistor 141 are electrically connected by the through electrode 260. The through electrode 260 electrically connecting the FD 121 and the gate electrode of the amplification transistor 141 is a contact electrode formed to extend through the insulation layer forming the wiring structure 112, an insulator 250 provided in the semiconductor layer 200, and the insulation layer 165 forming the wiring structure 212. The insulator 250 may be formed by forming an opening portion in a part of the semiconductor layer 200 and filling the opening portion with an insulator.

An element 261 such as a transistor forming a logic circuit is arranged in a main surface 302 of the semiconductor layer 300 of the structure 399 facing the semiconductor layer 200. The logic circuit can form at least a part of a circuit that controls the pixel circuit 191 provided in the structure 299 or processes a signal output from the pixel circuit 191. The logic circuit can include, for example, a vertical transfer circuit, a column signal processing circuit, a horizontal driving circuit, a system control circuit, and the like. The logic circuit processes a signal output from each pixel, and outputs the processed signal to the outside of the photoelectric conversion apparatus 500.

The vertical driving circuit drives, on a column basis, the plurality of pixels arranged in the photoelectric conversion apparatus 500 via, for example, the pixel driving lines C1 to C3 described above. For example, the column signal processing circuit performs Correlated Double Sampling (CDS) processing with respect to a pixel signal output from the pixel in the row driven by the vertical driving circuit. For example, the column signal processing circuit extracts the signal level of the pixel signal by performing the CDS processing, and holds the pixel data corresponding to the light receiving amount of the pixel. For example, the horizontal driving circuit sequentially outputs the pixel data held by the column signal processing circuit to the outside. For example, the system control circuit controls driving of respective blocks (the vertical driving circuit, the column signal processing circuit, and the horizontal driving circuit) in the logic circuit.

A low-resistance region including silicide may be formed in the surface of a region forming the source or drain of a transistor arranged in the logic circuit, or the surface of the gate electrode thereof. CoSi, NiSi, or the like may be used as the silicide. The silicide may be formed using a Self Aligned Silicide process. The silicide may also be used in the transistor included in the pixel circuit 191 arranged in the semiconductor layer 200. On the other hand, no silicide may be used in the transistor arranged in the semiconductor layer 100, such as the transfer transistor 111.

Figure 4:
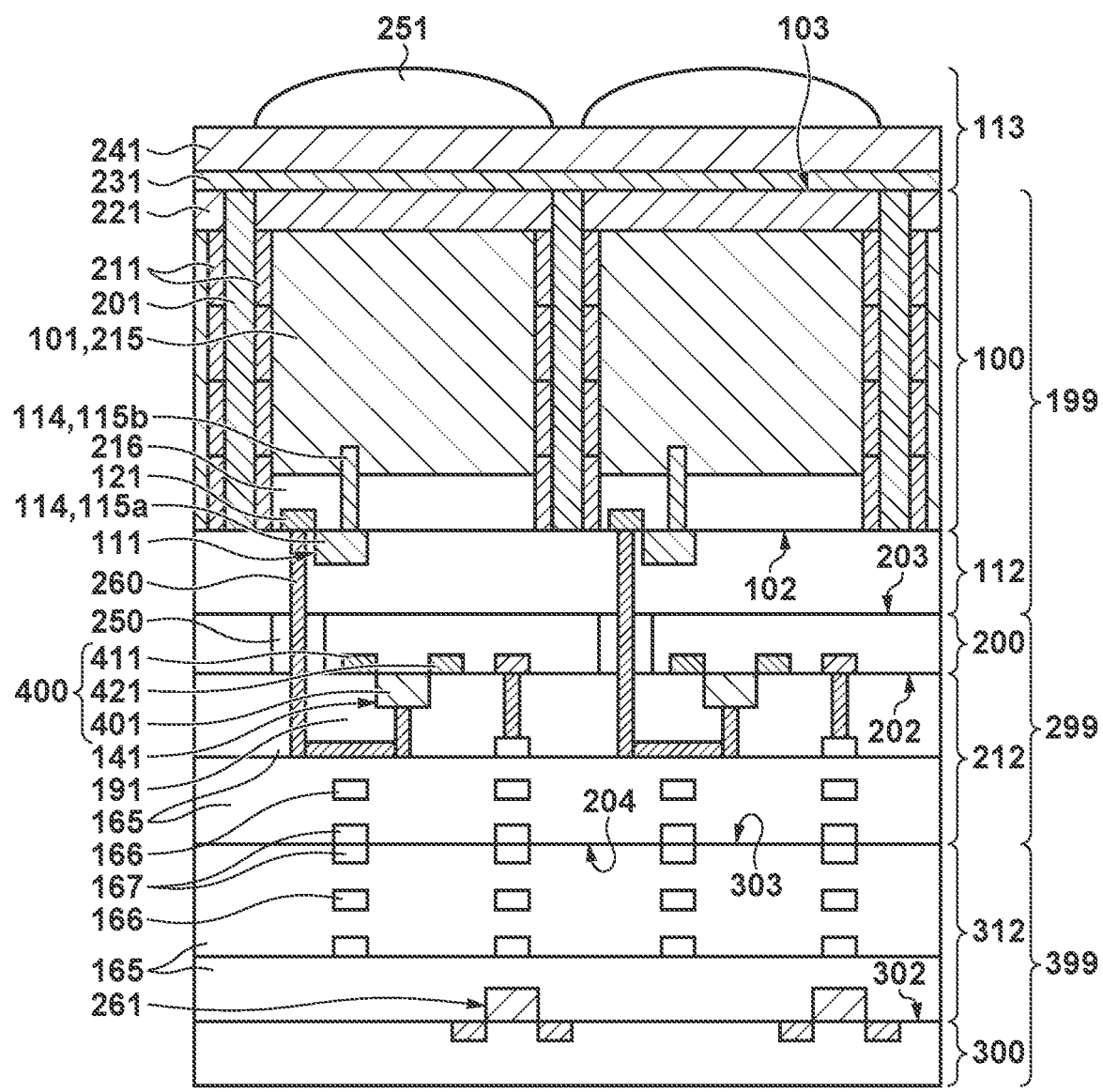
FIG. 4 is a sectional view showing a modification of the photoelectric conversion apparatus shown in FIG. 3.

FIG. 4 shows a modification of the sectional view shown in FIG. 3, which is an example in which the transfer transistor 111 has a vertical transfer gate electrode structure. Similar to the planar gate electrode 114 shown in FIG. 3, a portion 115a of the gate electrode 114 is arranged adjacent to the FD 121. The gate electrode 114 also includes a portion 115b arranged so as overlap the photoelectric conversion element 101 (semiconductor region 215) and the portion 115a in an orthogonal projection with respect to the main surface 102 of the semiconductor layer 100. The portion 115b can extend through the semiconductor region 216. An insulation layer (gate insulation film) is arranged in the interface between the gate electrode 114 (portions 115a and 115b) and the semiconductor regions 215 and 216. The signal charges generated by the photoelectric conversion element 101 are transferred to the FD 121 via the channel generated by the gate electrode 114 having the vertical transfer gate electrode structure.

The vertical transfer gate electrode structure (the portion 115b of the gate electrode 114) is formed from the main surface 102 of the semiconductor layer 100 toward the surface 103 in the depth direction of the semiconductor layer 100. The portion 115b of the gate electrode 114 makes it possible to efficiently transfer the signal charges to the FD 121 even if the photoelectric conversion element 101 (semiconductor region 215) is arranged in a deep region away from the main surface 102 of the semiconductor layer 100. Thus, it is possible to form another element in the main surface 102 of the semiconductor layer 100 without interfering with the photoelectric conversion element 101.

Further, as compared to the planar gate electrode, the vertical transfer gate electrode structure can largely change the potential of the photoelectric conversion element 101 (semiconductor region 215). Therefore, in the photoelectric conversion element 101 (semiconductor region 215), it is possible to increase the number of saturated electrons but decrease untransferred residual charges.

Figure 5:
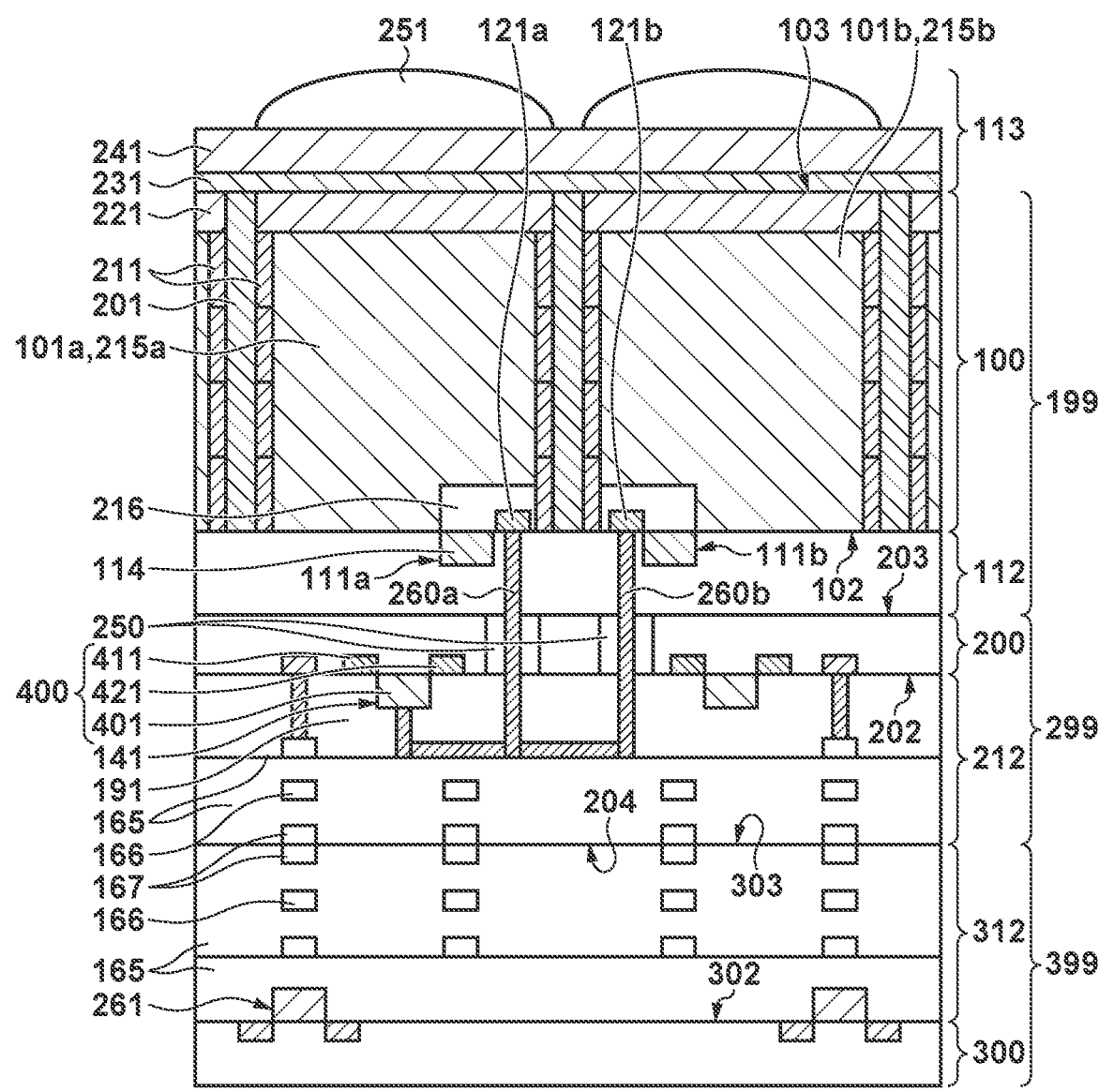
FIG. 5 is a sectional view showing a modification of the photoelectric conversion apparatus shown in FIG. 3.

FIG. 5 is a sectional view of the pixel arranged in the photoelectric conversion apparatus 500 according to the embodiment, and corresponds to the equivalent circuit diagram shown in FIG. 2. The FDs 121 of multiple photoelectric conversion elements 101 are electrically connected to each other, and connected to the gate electrode 401 of the pixel transistor 400 (the gate electrode of the amplification transistor 141) of the common pixel circuit 191. The remaining arrangement may be similar to the arrangement described above, so that different points will be mainly described.

FIG. 5 shows the sections of two pixels out of four pixels whose FDs 121 are connected to each other. An FD 121a connected to the photoelectric conversion element 101a via a transfer transistor 111a is connected to a through electrode 260a extending through the semiconductor layer 200. Similarly, an FD 121b connected to the photoelectric conversion element 101b via a transfer transistor 111b is connected to a through electrode 260b extending through the semiconductor layer 200. The two through electrodes 260a and 260b are electrically connected to the gate electrode of the amplification transistor 141 via the conductive pattern layer 166 provided in the first layer of the wiring structure 212.

Figure 6:
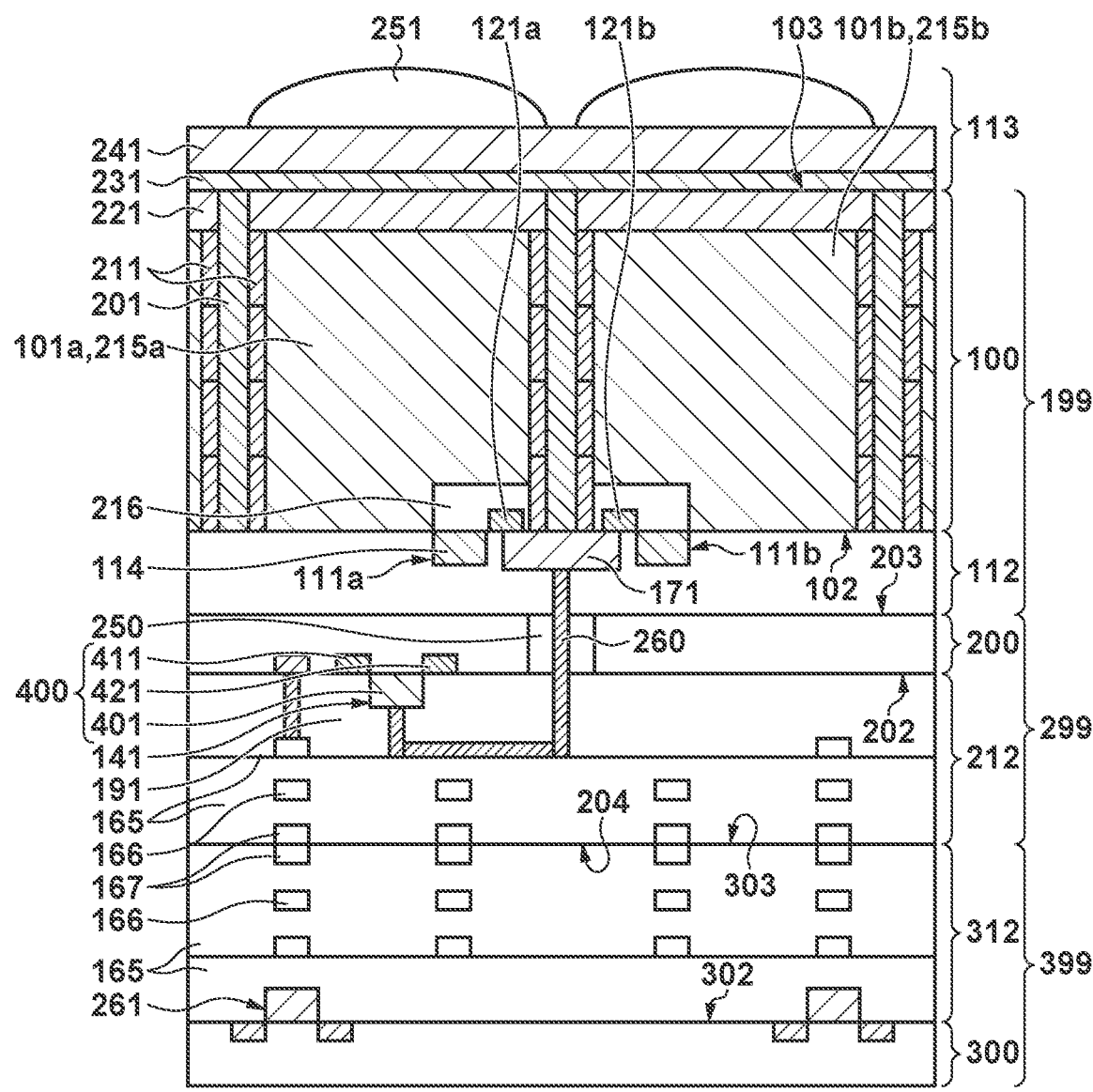
FIG. 6 is a sectional view showing a modification of the photoelectric conversion apparatus shown in FIG. 3.

FIG. 6 shows a modification of the sectional view shown in FIG. 5. FIG. 6 shows the sections of two pixels out of four pixels whose FDs 121 are connected to each other. As shown in FIG. 6, the FDs 121a to 121d of the four pixels, whose FDs 121 are connected to each other, are arranged so as to be gathered in the central portion of the four pixels. At this time, the four FDs 121a to 121d may be connected by a wiring pattern 171 arranged in the wiring structure 112. The wiring pattern 171 connecting the FDs 121a to 121d may be formed of, for example, polysilicon doped with impurity. In this case, the wiring pattern 171 may be formed simultaneously with the gate electrode 114 of the transfer transistor 111. Alternatively, the wiring pattern 171 may be formed of, for example, a conductive material with high heat resistance. The conductive material with high heat resistance can include tungsten, titanium, or the like.

The FDs 121a to 121d connected to the photoelectric conversion elements 101a to 101d via the transfer transistors 111a to 111d, respectively, are connected to one wiring pattern 171. The wiring pattern 171 is connected to the through electrode 260 extending through the semiconductor layer 200. The through electrode 260 is electrically connected to the gate electrode of the amplification transistor 141 via the conductive pattern layer 166 provided in the first layer of the wiring structure 212. With this, the FDs 121a to 121d are electrically connected to the gate electrode 401 of the pixel transistor 400 (in the arrangement shown in FIG. 6, the gate electrode of the amplification transistor 141). The FD 121 may be connected to one of the regions 411 and 421 functioning as the source or drain of the pixel transistor 400 serving as the reset transistor 131 via the through electrode 260 extending through the semiconductor layer 200. This also applies to each arrangement described above.

Figure 7:
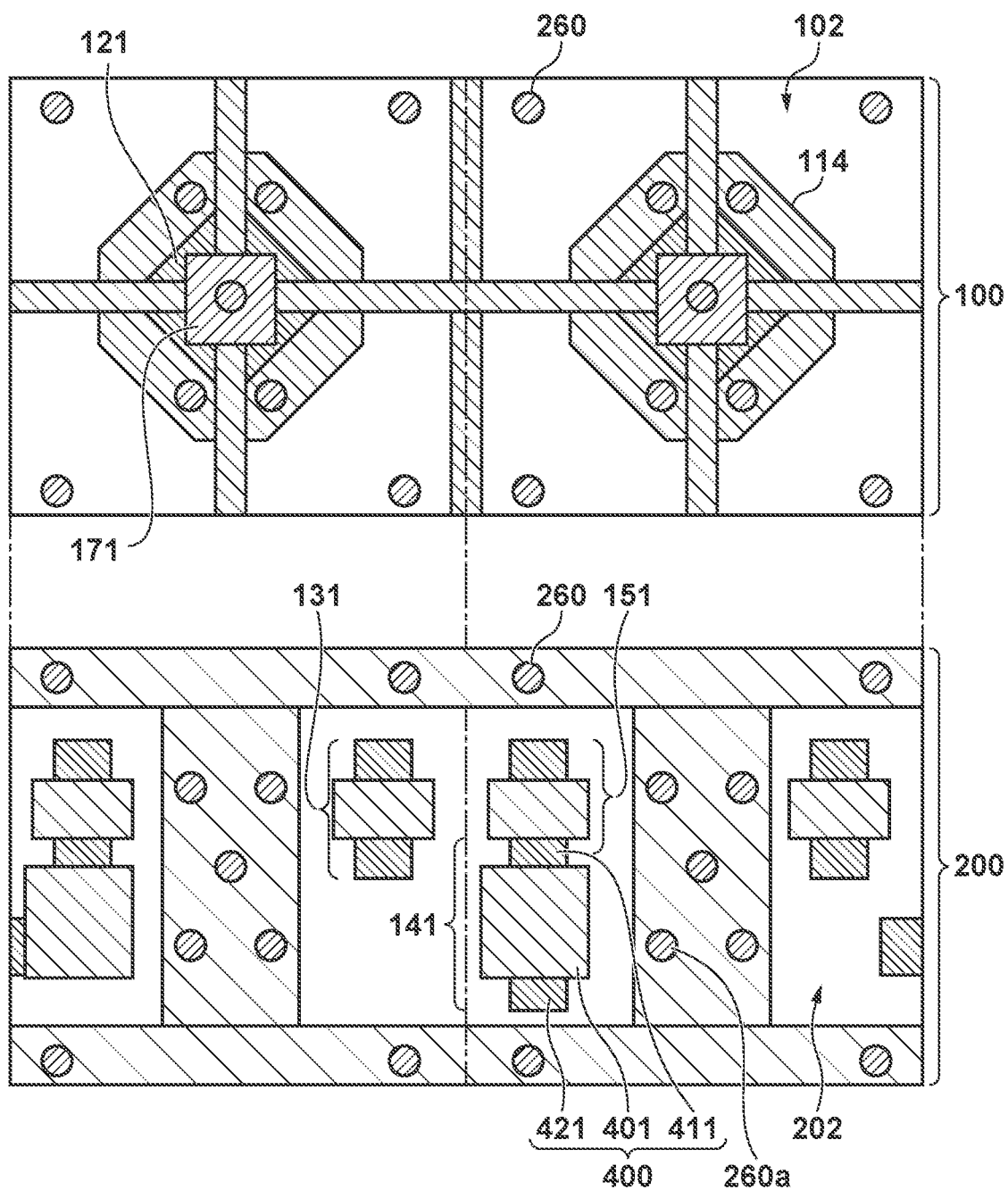
FIG. 7 is a plan view showing the arrangement of a photoelectric conversion apparatus of a comparative example.
Figure 8:
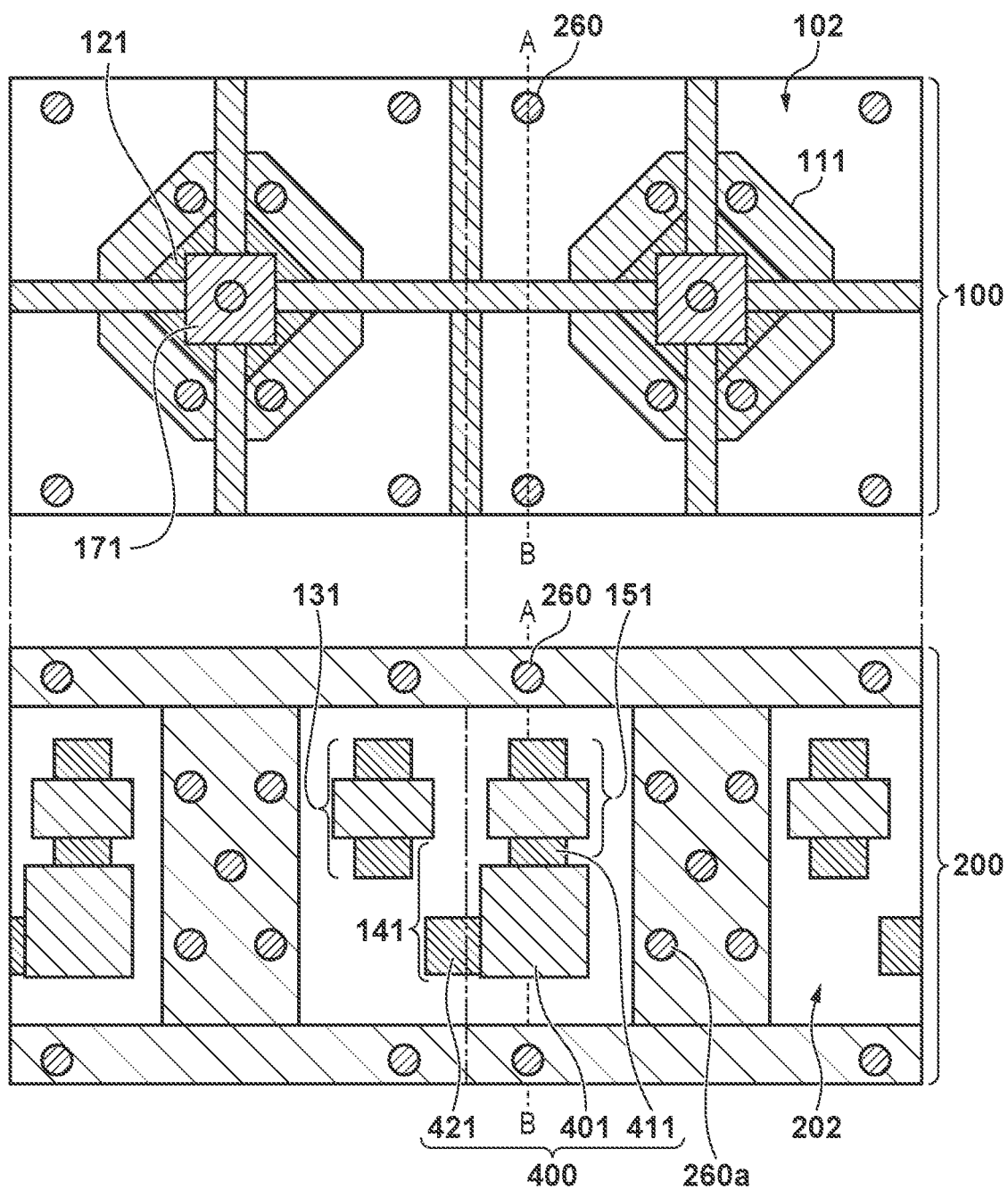
FIG. 8 is a plan view showing an example of the arrangement of the photoelectric conversion apparatus shown in FIG. 3.

Each of FIGS. 7 and 8 is a plan view of the pixel having the arrangement shown in FIGS. 2 and 6, in which the main surface 102 of the semiconductor layer 100 and the main surface 202 of the semiconductor layer 200 are shown. FIG. 7 is a plan view of a comparative example, and FIG. 8 is a plan view of the embodiment. As shown in FIGS. 7 and 8, the through electrode 260 is provided on the wiring pattern 171 connected to the four FDs 121. The through electrode 260 is arranged so as to extend through the insulator 250 provided in the semiconductor layer 200 as shown in FIG. 6. Although not shown in FIGS. 7 and 8, the through electrode 260 has a wiring structure in which it is electrically connected to the gate electrode of the amplification transistor 141.

In FIG. 7, as for the pixel transistor arranged in the semiconductor layer 200, an active region including the source, a region where the channel between the source and the drain is formed, and the drain is linearly arranged. In FIG. 7, by paying attention to the amplification transistor 141 as the pixel transistor 400, it can be seen that the region 411 functioning as one of the source and the drain, the region where the channel is formed and covered with the gate electrode 401, and the region 421 functioning as the other of the source and the drain are linearly arranged in the vertical direction of the drawing. The through electrode 260a is arranged adjacent to the side surface of the gate electrode 401. Here, the active region can be a pixel-isolated semiconductor region of each transistor.

In the arrangement shown in FIG. 7, the pixel transistors 400 such as the reset transistor 131 and the selection transistor 151 are also arranged in the vertical direction of the drawing. The amplification transistor 141 and the selection transistor 151 are arranged in series while sharing the region 411. Therefore, a space for arranging each transistor in the vertical direction of the drawing is required.

Further, when the through electrode 260, to which a desired potential is supplied, is arranged adjacent to the pixel transistor 400, the channel of the pixel transistor 400 can be influenced by the potential of the through electrode 260, and the threshold value of the pixel transistor 400 can fluctuate. Since the fluctuation of the threshold value changes in accordance with the positional relationship between the pixel transistor 400 and the through electrode 260, the threshold value of the pixel transistor 400 can vary due to the alignment variation.

The smaller the distance between the channel of the pixel transistor 400 and the through electrode 260, the greater the potential of the through electrode 260 influences on fluctuation of the threshold value of the pixel transistor 400. Therefore, it is appropriate to arrange the through electrode 260 away from the pixel transistor 400. However, the area of the semiconductor layer 200 is limited, and miniaturization of pixels advances to increase the pixel density or the like. Accordingly, if the through electrode 260 is arranged away from the pixel transistor 400, the area to arrange another element is compressed.

To avoid this, in the embodiment, as shown in FIG. 8, in the pixel transistor 400, in an orthogonal projection with respect to the main surface 202 of the semiconductor layer 200, the active region including the region 411 functioning as the source or the drain, the region 421 functioning as the drain or the source, and a region where the channel between the region 411 and the region 421 is formed is bent in the portion covered with the gate electrode 401. With this, as compared to the arrangement shown in FIG. 7, more room is generated in the vertical direction of the drawing. That is, the degree of freedom in arrangement of the pixel transistor 400 improves. The improvement of the degree of freedom in arrangement of the pixel transistor 400 can be used to further increase the pixel density. If it is unnecessary to increase the pixel density, the improvement of the degree of freedom in arrangement of the pixel transistor 400 leads to the improved margin against misalignment and the like.

Further, as will be described later in detail with reference to FIGS. 10A and 10B, the arrangement shown in FIG. 8 can increase the distance from the through electrode 260 to the channel formed between the source and the drain (between the region 411 and the region 421) as compared to the arrangement shown in FIG. 7. That is, it is possible to suppress variation of the threshold value of the pixel transistor 400 caused by the through electrode 260.

In FIG. 8, attention has been paid to the relationship between the amplification transistor 141 and the through electrode 260a, but the transistor whose source and drain are not linearly arranged is not limited to the amplification transistor 141. The structure according to the embodiment may be applied to the other pixel transistor 400 such as the selection transistor 151 or the reset transistor 131.

Figure 9:
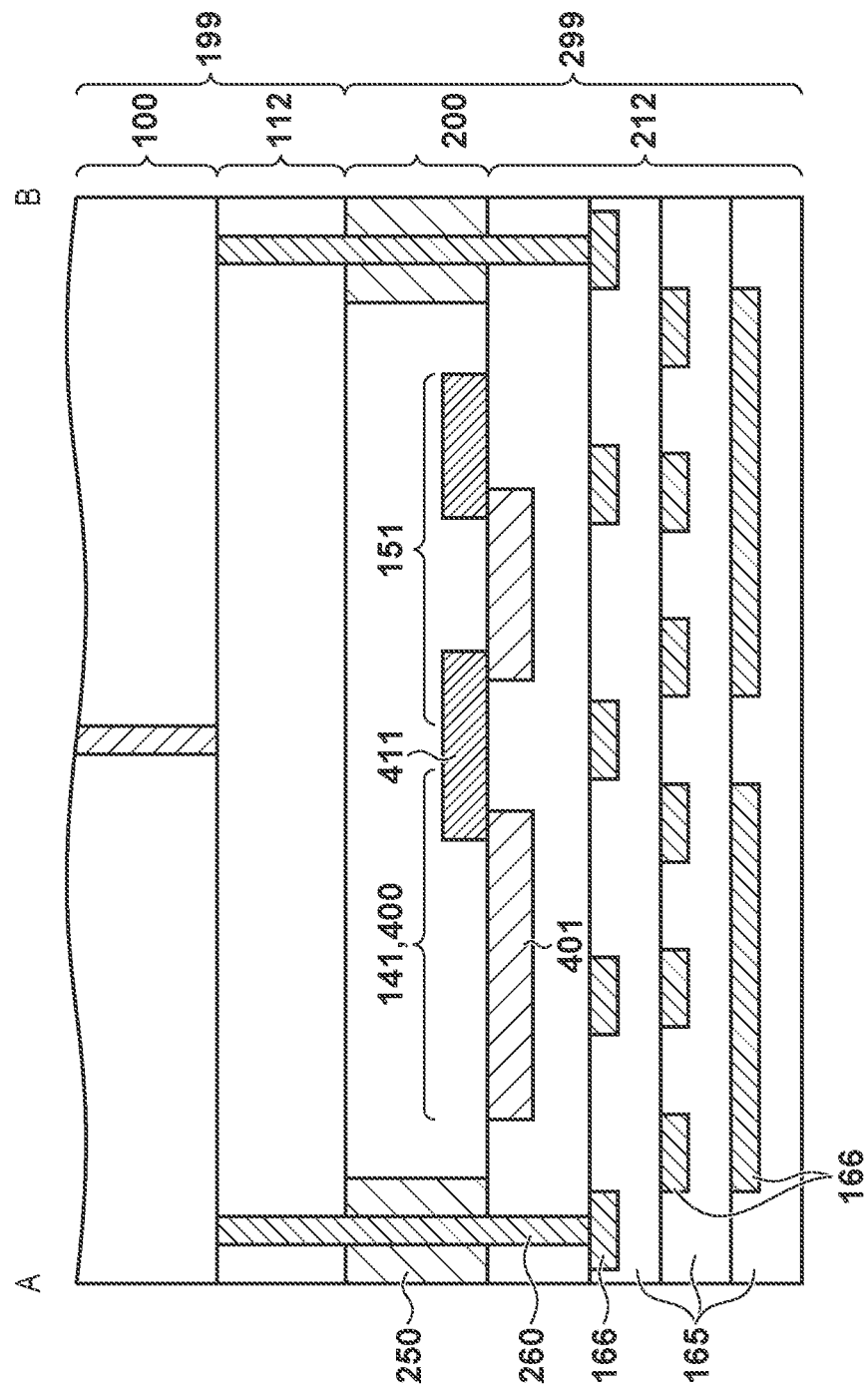
FIG. 9 is a sectional view showing an example of the arrangement of the photoelectric conversion apparatus shown in FIG. 1.

FIG. 9 is a sectional view taken along a line A-B in FIG. 8. The through electrode 260 is arranged from the semiconductor layer 200 to the semiconductor layer 100 while extending through the semiconductor layer 200. The through electrode 260 also exists in the region below the gate electrode 401 where the channel of the amplification transistor 141 (pixel transistor 400) is formed. The through electrode 260 is arranged in the proximity of the amplification transistor 141 (pixel transistor 400), but the regions 411 and 421 each functioning as the source or the drain are not linearly arranged with respect to the gate electrode 401.

Here, with reference to FIGS. 10A and 10B, the influence from the through electrode 260 to a channel 431 of the pixel transistor 400 will be described. Each of FIGS. 10A and 10B is a view showing the arrangement of the regions 411 and 421 each functioning as the source or drain of the pixel transistor 400, and the gate electrode arranged on the main surface 202 of the semiconductor layer 200 to form the channel 431 between an end portion 412 of the region 411 and an end portion 422 of the region 421. FIG. 10A shows the arrangement of a comparative example in which the regions 411 and 421 each functioning as the source or the drain and the channel 431 are linearly arranged. FIG. 10B shows the arrangement according to the embodiment.

Figure 10A:
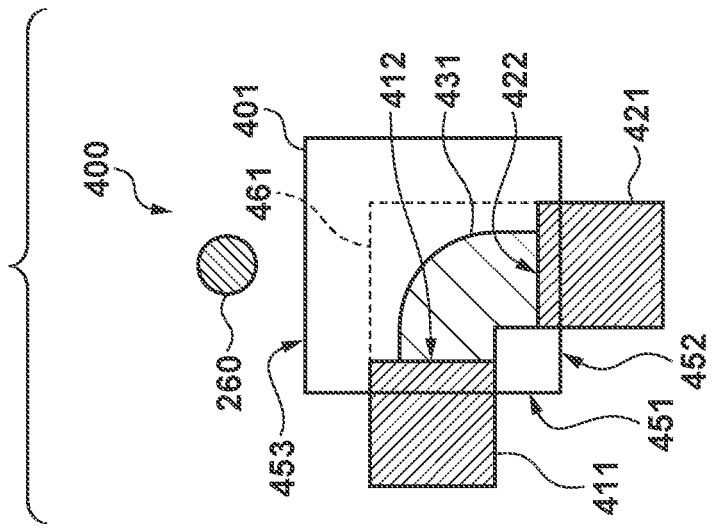
FIGS. 10A and 10B are views for explaining the effect of the photoelectric conversion apparatus shown in FIG. 8.
Figure 10B:
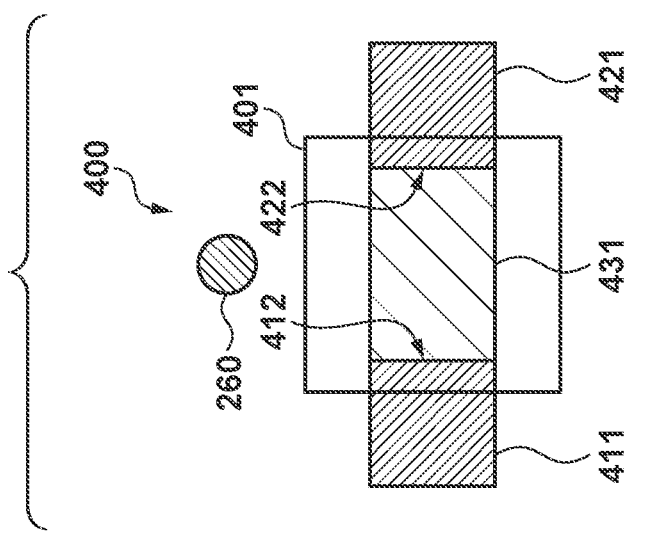

As shown in FIG. 10B, in the pixel transistor 400 according to the embodiment, in the orthogonal projection with respect to the main surface 202 of the semiconductor layer 200, the gate electrode 401 includes a side 451 in the proximity of the end portion 412 of the region 411 and a side 452 in the proximity of the end portion 422 of the region 421, and the side 451 and the side 452 extend in directions intersecting each other, respectively. Here, the side 451 "in the proximity of" the end portion 412 of the region 411 can be the side of the gate electrode 401 closest to the end portion 412 of the region 411. Alternatively, the side 451 "in the proximity of" the end portion 412 of the region 411 can be the side of the gate electrode 401 arranged on the region 411 in the orthogonal projection with respect to the main surface 202 of the semiconductor layer 200. Similarly, the side 452 "in the proximity of" the end portion 422 of the region 421 can be the side of the gate electrode 401 closest to the end portion 422 of the region 421. Alternatively, the side 452 "in the proximity of" the end portion 422 of the region 421 may be the side of the gate electrode 401 arranged on the region 421 in the orthogonal projection with respect to the main surface 202 of the semiconductor layer 200. In the orthogonal projection with respect to the main surface 202 of the semiconductor layer 200, the gate electrode 401 can cover the end portion 412 of the region 411 and the end portion 422 of the region 421. Further, in the orthogonal projection with respect to the main surface 202 of the semiconductor layer 200, an active region 461 including the regions 411 and 422 and a region where the channel 431 between the end portion 412 of the region 411 and the end portion 422 of the region 421 is formed is bent in the portion covered with the gate electrode 401. For example, as shown in FIG. 10B, the region 411 and the region 421 are arranged at a right angle with the gate electrode 401 as the center. Therefore, as compared to the arrangement shown in FIG. 10A, in the arrangement shown in FIG. 10B, the channel 431 formed between the end portion 412 of the region 411 and the end portion 422 of the region 421 is formed eccentrically in the direction in which the region 411 and the region 421 are located in the active region 461.

In this case, as shown in FIGS. 10A and 10B, even if the distance between the through electrode 260 and the gate electrode 401 is the same, the arrangement according to the embodiment shown in FIG. 10B can form the channel 431 farther away from the through electrode 260 than the arrangement of the comparative example shown in FIG. 10A. With the arrangement as described above, the influence of the potential of the through electrode 260 on the channel 431 of the pixel transistor 400 can be suppressed.

The arrangement shown in FIG. 10B shows the example in which each of the regions 411 and the region 421 is arranged at a right angle with respect to the gate electrode 401, and the through electrode 260 is arranged at a position facing the region 411 or the region 421. That is, in the orthogonal projection with respect to the main surface 202 of the semiconductor layer 200, the gate electrode 401 is rectangular, and the side 451 and the side 452 are arranged so as to be adjacent to each other. Further, as shown in FIG. 10B, the distance from the proximity through electrode (the through electrode 260 shown in FIG. 10B), which is closest to the pixel transistor 400 among the plurality of through electrodes 260 arranged in the photoelectric conversion apparatus 500, to the side 451 and the distance from the proximity through electrode to the side 452 are larger than the distance from the proximity through electrode to a side 453 arranged at a position facing the side 452. Here, the side 451 and the side 453 are sides arranged so as to be adjacent to each other.

However, the arrangement is not necessarily the arrangement as shown in FIG. 10B, and only required that the channel 431 is formed away from the through electrode 260. Each of the region 411 and the region 421 is arranged so as to have a predetermined angle with respect to the gate electrode 401. At this time, the through electrode 260 is arranged on the side (reflex angle side) on which the angle formed by the region 411 and the region 421 with respect to the gate electrode 401 is larger than 180°. With this, the channel 431 is eccentrically formed in the direction away from the through electrode 260.

Further, in the arrangement shown in FIG. 10B, the gate electrode 401 is rectangular (square) (the side 451 and the side 452 intersect at 90°), but the present disclosure is not limited to this. As has been described above, the channel 431 is only required to be formed away from the through electrode 260. The expression "the side 451 and the side 452 of the gate electrode 401 are arranged so as to be adjacent to each other" is not limited to forming one angle by the side 451 and the side 452. For example, the portion between the side 451 and the side 452 may be chamfered, or the side 451 and the side 452 may be connected by a curved line. This also applies to the relationship between the side 451 and the side 453.

Not only the amplification transistor 141 shown in FIGS. 8 and 9 but also the reset transistor 131 or the selection transistor 151 may have the above-described arrangement in which the channel 431 is formed away from the through electrode 260. With this, the degree of freedom in arrangement of the pixel transistor 400 in the semiconductor layer 200 improves. Further, fluctuation of the threshold value in each transistor caused by the through electrode 260 is suppressed. As a result, improvement of the pixel density and the operational reliability of the photoelectric conversion apparatus 500 can be implemented.

Figure 11:
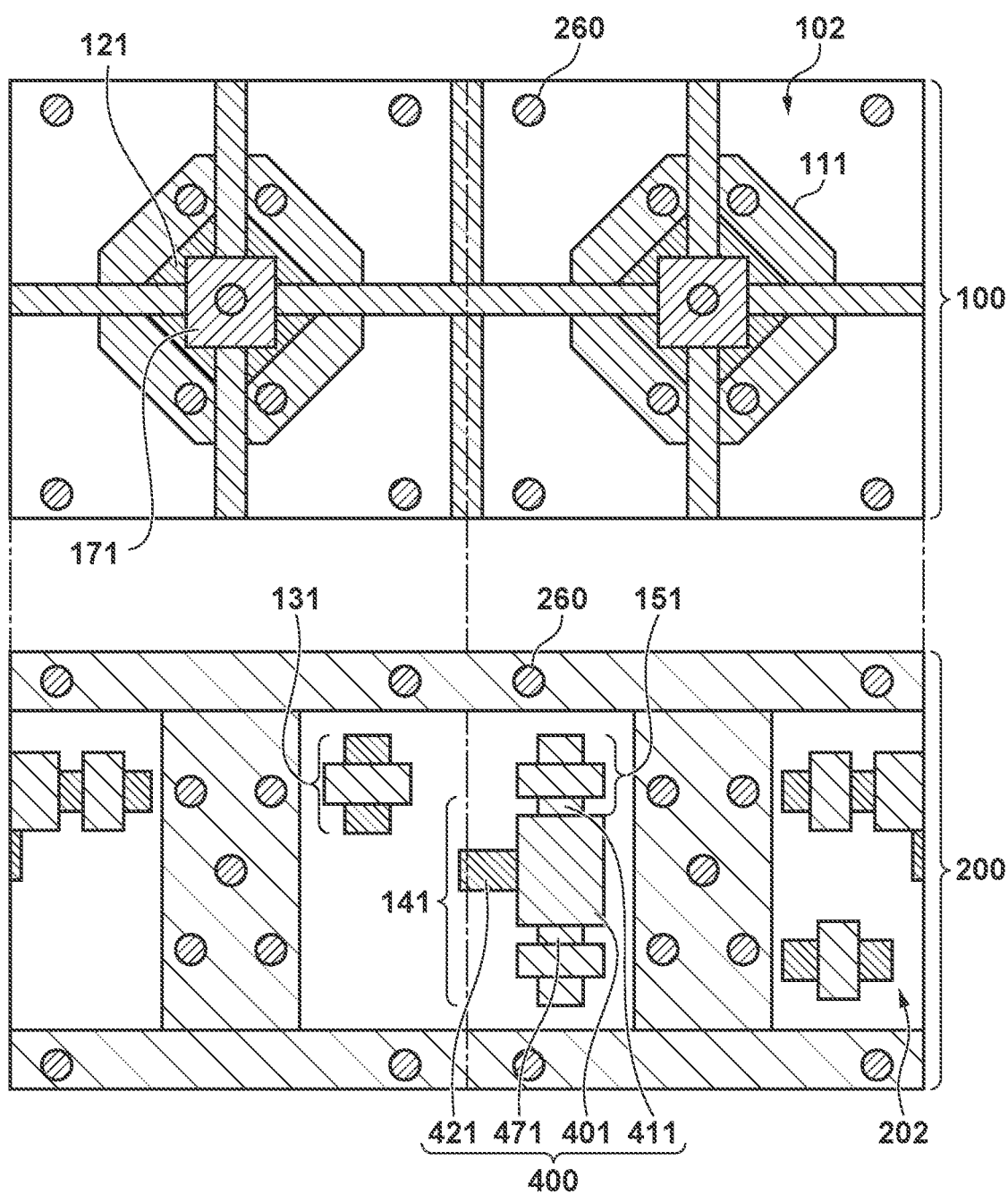
FIG. 11 is a plan view showing a modification of the photoelectric conversion apparatus shown in FIG. 3.
Figure 12:
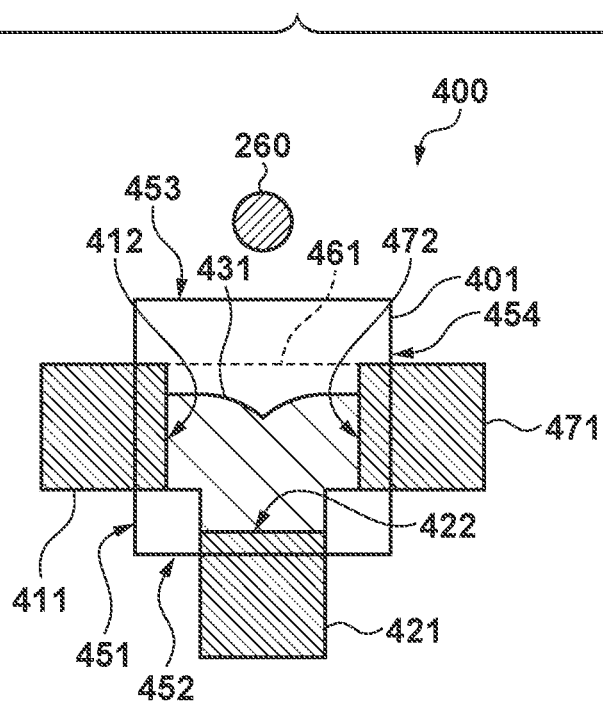
FIG. 12 is a view for explaining the effect of the photoelectric conversion apparatus shown in FIG. 11.

FIGS. 11 and 12 are views showing a modification of the arrangement shown in FIGS. 8 and 10B. In the arrangement shown in FIGS. 11 and 12, the pixel transistor 400 includes, in addition to the regions 411 and 421, a region 471 functioning as the source or drain. The gate electrode 401 forms the channel 431 between the end portion 412 of the region 411, the end portion 422 of the region 421, and an end portion 472 of the region 471, and includes a side 454 in the proximity of the end portion 472 of the region 471 in the orthogonal projection with respect to the main surface 202 of the semiconductor layer 200. Here, the side 454 "in the proximity of" the end portion 472 of the region 471 can be the side of the gate electrode 401 closest to the end portion 472 of the region 471. Alternatively, the side 457 "in the proximity of" the end portion 472 of the region 471 can be the side of the gate electrode 401 arranged on the region 471 in the orthogonal projection with respect to the main surface 202 of the semiconductor layer 200. The gate electrode 401 can cover the end portion 472 of the region 471. As shown in FIG. 12, in the orthogonal projection with respect to the main surface 202 of the semiconductor layer 200, the side 451 and the side 454 are arranged so as to face each other. Further, as in the arrangement shown in FIG. 10, the through electrode 260 closest to the pixel transistor 400 is arranged in the proximity of the side 453 facing the side 452. Therefore, in the orthogonal projection with respect to the main surface 202 of the semiconductor layer 200, the active region 461 including the region 411, the region 421, the region 471, and a region where the channel 431 between the end portion 412 of the region 411, the end portion 422 of the region 421, and the end portion 472 of the region 471 is formed is T-shaped.

In this case, the region 411 and the region 471 are made to function as one of the source and the drain, and the region 421 is made to function as the other of the source and the drain. In the arrangement shown in FIGS. 11 and 12, the regions 411 and 471 can function as the source of the amplification transistor 141, and the region 421 can function as the drain of the amplification transistor 141. With this arrangement, as shown in FIG. 12, the channel 431 formed between the regions 411, 421, and 471 is eccentrically formed in the direction where the region 421 is located in the active region 461. Accordingly, as shown in FIG. 12, by arranging the through electrode 260 at a position facing the region 421, the influence of the potential of the through electrode 260 on the channel 431 of the pixel transistor 400 can be suppressed.

In the arrangement shown in FIG. 12, the example has been described in which the region 421 is arranged at a right angle with respect to the region 411 and the region 471 with the gate electrode 401 as the center, and the through electrode 260 is arranged at the position facing the region 421. However, the arrangement is not necessarily the arrangement as shown in FIG. 10B, and only required that the channel 431 is formed away from the through electrode 260.

If the sizes of the gate electrode 401 and the like are substantially the same between the arrangements, the arrangement shown in FIG. 12 can increase the area to form the channel 431 as compared to the arrangement shown in FIG. 10B. In the transistor, when charges are trapped/discharged in a dangling bond existing near the interface between a semiconductor layer and a gate insulation film arranged below the gate electrode, random telegraph signal (RTS) noise, which is caused by the output value fluctuating randomly in time between two states of a trap state and a discharge state, can occur. For the RTS noise, the larger the area of the channel 431, the more the influence of output fluctuation caused by charge trapping can be suppressed. Therefore, the arrangement shown in FIGS. 11 and 12 has better noise resistance than the arrangement shown in FIGS. 8 and 10B. As for the arrangement shown in FIGS. 11 and 12, the example has been described in which the pixel transistor 400 (amplification transistor 141) includes one drain and two sources, but the pixel transistor 400 may include two drains and one source.

Figure 13:
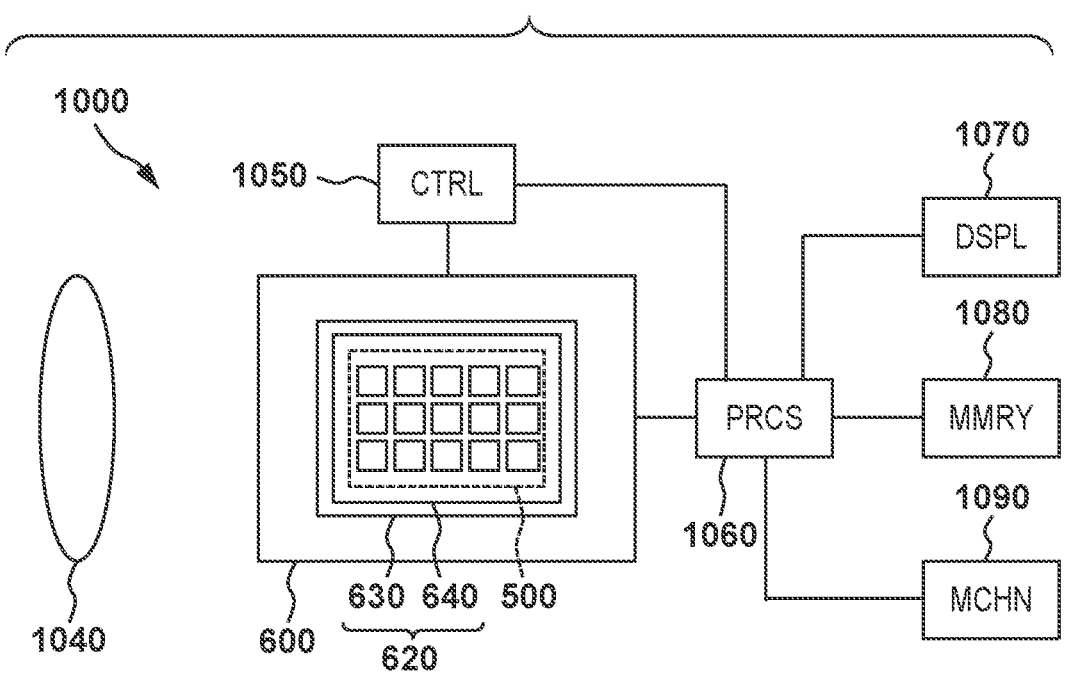
FIG. 13 is a view showing an example of the arrangement of equipment incorporating the photoelectric conversion apparatus according to the embodiment.

Equipment 1000 including the photoelectric conversion apparatus 500 according to the embodiment shown in FIG. 13 will be described below in detail. The photoelectric conversion apparatus 500 is accommodated in a package 620 and mounted in the equipment 1000. An electronic component 600 can include the package 620 including a base 630 on which the photoelectric conversion apparatus 500 is fixed and a cover 640 made of glass or the like facing the photoelectric conversion apparatus 500. A bonding member such as a wire and bump for connecting an internal terminal of the base 630 and a terminal such as a pad electrode of the photoelectric conversion apparatus 500 can be arranged in the package 620.

The equipment 1000 can include at least one of an optical apparatus 1040, a control apparatus 1050, a processing apparatus 1060, a display apparatus 1070, a storage apparatus 1080, and a mechanical apparatus 1090. The optical apparatus 1040 is implemented by, for example, a lens, a shutter, and a mirror. The control apparatus 1050 controls the photoelectric conversion apparatus 500. The control apparatus 1050 is, for example, a semiconductor apparatus such as an ASIC.

The processing apparatus 1060 processes a signal output from the photoelectric conversion apparatus 500. The processing apparatus 1060 is a semiconductor apparatus such as a CPU or an ASIC for forming an Analog Front End (AFE) or a Digital Front End (DFE). The display apparatus 1070 is an EL display apparatus or a liquid crystal display apparatus that displays information (image) obtained by the photoelectric conversion apparatus 500. The storage apparatus 1080 is a magnetic device or a semiconductor device that stores the information (image) obtained by the photoelectric conversion apparatus 500. The storage apparatus 1080 is a volatile memory such as an SRAM or a DRAM, or a nonvolatile memory such as a flash memory or a hard disk drive.

The mechanical apparatus 1090 includes a moving or propulsion unit such as a motor or an engine. In the equipment 1000, the signal output from the photoelectric conversion apparatus 500 is displayed on the display apparatus 1070 or transmitted to an external apparatus by a communication apparatus (not shown) included in the equipment 1000. Hence, the equipment 1000 may further include the storage apparatus 1080 and the processing apparatus 1060 in addition to the memory circuits and arithmetic circuits included in the photoelectric conversion apparatus 500. The mechanical apparatus 1090 may be controlled based on the signal output from the photoelectric conversion apparatus 500.

In addition, the equipment 1000 is suitable for electronic equipment such as an information terminal (for example, a smartphone or a wearable terminal) which has a shooting function or a camera (for example, an interchangeable lens camera, a compact camera, a video camera, or a monitoring camera). The mechanical apparatus 1090 in the camera can drive the components of the optical apparatus 1040 in order to perform zooming, an in-focus operation, and a shutter operation. Alternatively, the mechanical apparatus 1090 in the camera can move the photoelectric conversion apparatus 500 in order to perform an anti-vibration operation.

Furthermore, the equipment 1000 can be transportation equipment such as a vehicle, a ship, or an airplane. The mechanical apparatus 1090 in the transportation equipment can be used as a moving apparatus. The equipment 1000 as the transportation equipment is suitable for an apparatus that transports the photoelectric conversion apparatus 500 or an apparatus that uses an image capturing function to assist and/or automate driving (steering). The processing apparatus 1060 for assisting and/or automating driving (steering) can perform, based on the information obtained by the photoelectric conversion apparatus 500, processing for operating the mechanical apparatus 1090 as a moving apparatus. Alternatively, the equipment 1000 may be medical equipment such as an endoscope, measurement equipment such as a distance measurement sensor, analysis equipment such as an electron microscope office equipment such as a copy machine, or industrial equipment such as a robot.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-016354, filed Feb. 6, 2023, which is hereby incorporated by reference herein in its entirety.

What is claimed is:

1. A photoelectric conversion apparatus in which a first semiconductor layer comprising a photoelectric conversion element and a second semiconductor layer comprising a pixel circuit configured to output a signal based on charges generated by the photoelectric conversion element are stacked, wherein
    a plurality of through electrodes are arranged in the second semiconductor layer, each of which extends through the second semiconductor layer and electrically connects an element arranged in the first semiconductor layer with an element arranged in the second semiconductor layer, the pixel circuit includes a pixel transistor comprising a first region and a second region configured to function as a source or a drain, and a gate electrode arranged on a main surface of the second semiconductor layer to form a channel between a first end portion of the first region and a second end portion of the second region, in an orthogonal projection with respect to the main surface, the gate electrode includes a first side in proximity to the first end portion and a second side in proximity to the second end portion, and the first side and the second side extend in directions intersecting each other, respectively.

2. The apparatus according to claim 1, wherein
the first side and the second side are arranged so as to be adjacent to each other.

3. The apparatus according to claim 2, wherein
in the orthogonal projection with respect to the main surface, the gate electrode is rectangular.

4. The apparatus according to claim 1, wherein
the gate electrode further includes a third side arranged so as to face the first side in the orthogonal projection with respect to the main surface, the plurality of through electrodes include a proximity through electrode which is closest to the pixel transistor, and each of a distance from the proximity through electrode to the first side and a distance from the proximity through electrode to the second side is larger than a distance from the proximity through electrode to the third side.

5. The apparatus according to claim 4, wherein
the second side and the third side are arranged so as to be adjacent to each other.

6. The apparatus according to claim 2, wherein
in the orthogonal projection with respect to the main surface, an active region including the first region, the second region, and a region where a channel between the first end portion and the second end portion is formed is bent in a portion covered with the gate electrode.

7. The apparatus according to claim 1, wherein
the pixel transistor further comprises a third region configured to function as a source or a drain, and the gate electrode forms a channel between the first end portion, the second end portion, and a third end portion of the third region, and further includes a fourth side in proximity to the third end portion in the orthogonal projection with respect to the main surface.

8. The apparatus according to claim 4, wherein
the pixel transistor further comprises a third region configured to function as a source or a drain, the gate electrode forms a channel between the first end portion, the second end portion, and a third end portion of the third region, and further includes a fourth side in proximity to the third end portion in the orthogonal projection with respect to the main surface, and in the orthogonal projection with respect to the main surface, the second side and the fourth side are arranged so as to face each other.

9. The apparatus according to claim 8, wherein
the first region and the third region function as one of a source and a drain, and the second region functions as another of the source and the drain.

10. The apparatus according to claim 7, wherein
in the orthogonal projection with respect to the main surface, the gate electrode covers the third end portion.

11. The apparatus according to claim 7, wherein
in the orthogonal projection with respect to the main surface, an active region including the first region, the second region, the third region, and a region where a channel between the first end portion, the second end portion, and the third end portion is formed is T-shaped.

12. The apparatus according to claim 1, wherein
in the orthogonal projection with respect to the main surface, the gate electrode covers the first end portion and the second end portion.

13. The apparatus according to claim 1, wherein
the main surface is a surface of the second semiconductor layer on an opposite side of a surface facing the first semiconductor layer.

14. The apparatus according to claim 1, wherein
the pixel circuit is shared by multiple photoelectric conversion elements including the photoelectric conversion element.

15. The apparatus according to claim 1, wherein
the first semiconductor layer further comprises a floating diffusion, and a transfer transistor arranged between the photoelectric conversion element and the floating diffusion.

16. The apparatus according to claim 15, wherein
the pixel transistor includes a reset transistor configured to reset a potential of the floating diffusion.

17. The apparatus according to claim 15, wherein
the pixel transistor includes an amplification transistor configured to amplify a potential of the floating diffusion.

18. The apparatus according to claim 15, wherein
the pixel transistor includes a selection transistor configured to output, from the pixel circuit, a signal corresponding to a potential of the floating diffusion.

19. The apparatus according to claim 1, wherein
a third semiconductor layer comprising at least one of a circuit configured to control the pixel circuit and a circuit configured to process a signal output from the pixel circuit is further stacked.

20. Equipment comprising:
the photoelectric conversion apparatus according to claim 1; and a processing apparatus configured to process a signal output from the photoelectric conversion apparatus.

* * * * *